A. ALLCOTT.
ANTIFRICTION CARRIAGE AXLE.

No. 101,205.   Patented Mar. 29, 1870.

Witnesses.
Chas. F. Brown.
Aug. P. Baker.

Inventor.
Alonzo Allcott,
by Carroll D. Wright
Atty.

United States Patent Office.

ALONZO ALLCOTT, OF HAVERHILL, MASSACHUSETTS.

Letters Patent No. 101,205, dated March 29, 1870.

IMPROVEMENT IN ANTI-FRICTION CARRIAGE-AXLES.

The Schedule referred to in these Letters Patent and making part of the same.

*To all whom it may concern:*

Be it known that I, ALONZO ALLCOTT, of Haverhill, in the county of Essex and State of Massachusetts, have invented an improved Anti-Friction Axle; and I do hereby declare that the following is a full, clear, and exact description of the construction and operation of the same, reference being had to the accompanying drawings and letters of reference marked thereon, making a part of this specification, in which—

Figure 1:
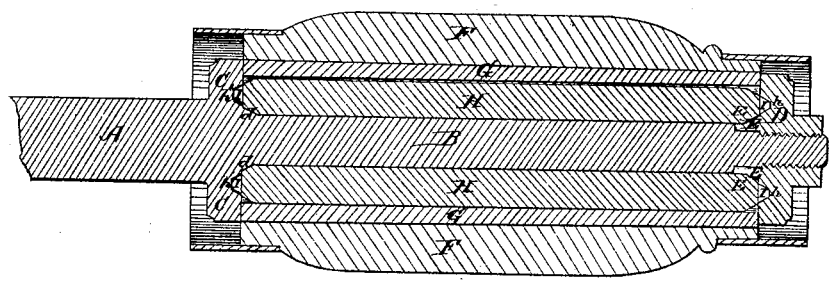

Figure 1 is a longitudinal vertical central section of my invention, and

Figure 2:
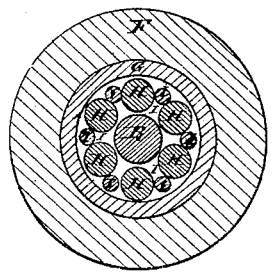

Figure 2, a transverse vertical section of the same.

This invention has for its object the diminution of friction in ordinary axle-boxes, and consists in constructing the hub-box larger than the journal of the axle, and filling the space between the journal and the box with longitudinal metallic rollers, of which two sizes are employed, the larger and smaller alternating, and more completely filling said space.

In the drawings—

A represents the axle, and

B its journal.

The former is formed with the grooved flange C, and the latter with the similarly-grooved nut D.

The inner end of the journal B is somewhat thickened, as shown at $d$, and the projecting sleeve E on the nut D is similarly shaped.

F represents the hub, and G the box thereof, which latter is larger than the journal B, and into the space intervening are placed the larger longitudinal metal rollers H, which may be of any number and size sufficient to nearly fill said space around the journal.

I I are a series of smaller rollers inserted in the interstices between the larger rollers H, and whose ends are beveled and project into the concentric grooves $h$ in the flange C and nut D.

The ends of the rollers H are also somewhat beveled to correspond with the tapering portions $d$ and E of the journal B and nut D.

The rollers H and I revolve freely, the former being in rolling contact with the journal B and box G, and the latter with the rollers H, the whole tending to diminish friction, and requiring no lubrication.

When the beveled ends of the rollers H become worn down the beveled sleeve E on the nut D may be filed down, and the nut screwed up, thus keeping the rollers from any longitudinal motion.

The thick portion $d$ of the journal B makes the same much stronger.

The device may be employed for horse-car axles, pulleys, and other like purposes, as well as on ordinary carriage-axles.

Having thus fully described my invention,

What I claim as new, and desire to secure by Letters Patent, is—

1. The axle A and journal B, with flange C, having the groove $h'$ and beveled portion $d\,d$, in combination with nut D, having groove $h$, and rollers H I, substantially as described.

2. The nut D, with its beveled groove $h$, and beveled sleeve E, as and for the purpose set forth.

In testimony whereof I have signed my name to this specification in the presence of two subscribing witnesses.

ALONZO ALLCOTT.

Witnesses:
CARROLL D. WRIGHT,
CHARLES F. BROWN.